United States Patent [19]

Bozzi et al.

[11] 4,115,328

[45] Sep. 19, 1978

[54] PROCESS FOR MAKING STABLE SOLVENT-FREE, AQUEOUS EPOXY RESIN DISPERSIONS

[75] Inventors: Edward G. Bozzi, Yorktown Heights; Robert C. Nelson, Central Valley, both of N.Y.

[73] Assignee: Ciba-Geigy Corporation, Ardsley, N.Y.

[21] Appl. No.: 757,530

[22] Filed: Jan. 7, 1977

[51] Int. Cl.$^2$ .......................... C09D 3/40; C09D 3/52; C09D 3/56; C09D 3/58

[52] U.S. Cl. ........................................ 260/24; 260/25; 260/29.2 EP; 260/29.3; 260/29.4 R; 428/418

[58] Field of Search ..................... 260/24, 29.2 EP, 25, 260/29.4 R, 29.3

[56] References Cited

U.S. PATENT DOCUMENTS

| 3,282,863 | 11/1966 | Carey et al. | 260/29.2 EP |
|---|---|---|---|
| 3,772,228 | 11/1973 | Allen | 260/29.2 EP |
| 3,879,324 | 4/1975 | Timmons et al. | 260/29.2 EP |
| 3,888,812 | 6/1975 | Plettner | 260/24 |
| 3,905,929 | 9/1975 | Noll | 260/29.2 TN |
| 3,935,146 | 1/1976 | Noll et al. | 260/29.4 R |

FOREIGN PATENT DOCUMENTS

| 1,575,303 | 7/1969 | France | 260/29.2 EP |
|---|---|---|---|
| 2,424,887 | 12/1974 | Fed. Rep. of Germany | 260/29.2 EP |

OTHER PUBLICATIONS

Chemical Abstracts, vol. 82, No. 16, Apr. 21, 1975, p. 100258b.

Primary Examiner—Ronald W. Griffin
Attorney, Agent, or Firm—Luther A. R. Hall

[57] ABSTRACT

Essentially, solvent-free, stable aqueous dispersions or low solvent emulsions of epoxy resins are made through use of selected nonionic surfactants and selected organic solvents followed by vacuum distillation of most or almost all of the organic medium. The stable aqueous emulsions are useful for making coatings, films and the like.

28 Claims, No Drawings

PROCESS FOR MAKING STABLE SOLVENT-FREE, AQUEOUS EPOXY RESIN DISPERSIONS

BACKGROUND OF THE INVENTION

This invention pertains to an improved process for preparing essentially solvent-free aqueous epoxy resin dispersions or low solvent emulsions useful in the preparation of water-dilutable, heat-curable coating compositions, and to the dispersions or emulsions made by said process.

It is well known in the art that many synthetic resins can be prepared by emulsion polymerization and that it is not difficult to prepare stable aqueous dispersions of said resins by addition of the solid resin and an appropriate dispersing agent to water with stirring. However for polymers such as the epoxy resins, which cannot be prepared by emulsion polymerization, aqueous dispersions must be made by dispersing the bulk polymer in water. Such dispersions are generally quite unstable separating in only a short time as from a few hours to a few days. These dispersions of bulk epoxy resins also generally exhibit poor film forming properties. Both of these disadvantages of poor dispersion stability and poor film properties are largely due to the large particle size of the resin. The particle size of the resin in the previously formed dispersions of bulk polymers have been of the order of 50 microns or larger.

The preparation of polyepoxide dispersion coating compositions is disclosed in U.S. Pat. No. 3,772,228, wherein a one-package, thermoset coating composition is prepared by grinding and dispersing a solid, friable polyepoxide, a solid, friable epoxy curing agent (such as a polyanhydride) and optionally an epoxy curing accelerator in a liquid which is a non-solvent for the various components. Aliphatic hydrocarbons are preferred. These are epoxy dispersions, but they are not aqueous and possess the inherent hazards involved in the use of hydrocarbon solvents.

The preparation of organic solvent free stable aqueous dispersions of epoxy resins of relatively low molecular weight (200 to 4,000, preferably 240 to 1,300) having particle size of less than about 10 microns using cationic, anionic and nonionic dispersing agents is disclosed in U.S. Pat. No. 3,879,324. Cationic dispersing agents are preferred. The process described to prepare said epoxy dispersions involved heating the epoxy resin to the fluid state, mixing with water and the dispersing agent at the elevated temperature, followed by passing the mixture through a colloid mill. Only those epoxy resins melting below 100° C., the boiling point of water, can be dispersed by this process accounting for the molecular weight limitation noted. This limitation is a severe one eliminating many useful epoxy resin systems of high molecular weight which can be employed in the instant process.

The preparation of stable aqueous polyurethane elastomer dispersions in the absence of added surfactants is described in U.S. Pat. No. 3,905,929 by the process of dissolving the polyurethane in an organic solvent, miscible with water and inert toward isocyanate groups such as acetone or methyl ethyl ketone, adding water to the stirred solution and removing the organic solvent by distillation. The preparation of stable aqueous polyurethaneamide dispersions, also in the absence of added surfactants, by the same procedure is taught in U.S. Pat. No. 3,935,146.

The preparation of aqueous dispersions of solid epoxy resins is described in German Offen. No. 2,424,887 by the process of passing to a high shear mixer a first stream consisting of water and certain dispersing agents and a second stream containing a molten solid resin or a solution of a solid resin in certain organic solvents, mixing at high shear to give the stated degree of dispersion and removing the organic solvent if present by vacuum distillation.

The dispersing agents useful in the process of German Offen. No. 2,424,887 are primarily synthetic materials derived from cellulose, such as guargums, and polyvinyl alcohols which can have terminal or pendant alkyl ether, arylalkyl ether, phenoxy, amide or amine groups. Examples of dispersing agents useful in this process include polyvinyl alcohol, guargum and some nonylphenoxypoly(ethyleneoxy)ethanol materials.

The instant invention is distinguished from the above process in that, among the myriad of possible dispersing agents which might be employed in the general process described in German Offen. No. 2,424,887, one class of dispersing agents, namely the poly(ethylene oxide) esters of fatty acids, gives far superior performance both in the improved process itself, but also in the properties of the coatings and finishes made using the instant compositions.

Additionally, German Offen. No. 2,424,887 describes the use of solid epoxy resins having a molecular weight under the lower 4,000 molecular weight limit of the instant process. The surfactants described by this reference are relatively ineffectual in the instant process with higher molecular weight epoxy resins. Criticality exists between the instant class of nonionic surfactants required to prepare in a practical way dispersions or low solvent emulsions of high molecular weight epoxy resins as described in the instant process.

DETAILED DISCLOSURE

The improved process of this invention relates to a method of preparing a stable aqueous dispersion or an aqueous, low organic solvent emulsion of an epoxy resin having a molecular weight from about 4,000 to about 100,000, useful in forming water-dilutable, heat-curable coating compositions with aminoplast or phenoplast curing systems, which involves dissolving said epoxy resin in an organic solvent to prepare a 40 to 80% by weight solution, said organic solvent containing from 1 to 25% by weight based on the epoxy resin of a nonionic surfactant and said organic solvent having a boiling point below 160° C. and being selected from the group consisting of aromatic hydrocarbons, esters, ethers, alcohols, ketones, halogenated aromatic hydrocarbons and mixtures thereof, adding with stirring sufficient water to give a mixture containing from 30 to 50% by weight water, subjecting the resulting mixture to homogenizing action using a colloid mill, homogenizer or other high speed, high shear mixer, removing essentially all the organic solvent present by vacuum distillation at a temperature under 40° C. and with a pressure of about 5 to 100 mm Hg to give an essentially solvent free aqueous dispersion having from about 2 to 5% by weight organic solvent and from about 40 to 65 weight percent epoxy resin, from about 0.5 to 13 weight percent nonionic surfactant and from about 35 to 60 weight percent water; or removing from 40 to 70 percent of the organic solvent by vacuum distillation at a temperature under 40° C. and with a pressure of about 5 to 100 mm Hg to give a low solvent emulsion having from about 35 to 65 weight percent epoxy resin, from about 0.5 to 13 weight percent nonionic surfactant, from about 8 to 20 weight percent organic solvent and from about 35 to 60 weight percent water, wherein the improvement comprises using as the nonionic surfactant a dispersing agent selected from the group consisting of the polyoxyethylene esters of fatty, rosin and tall oil acids having 8 to 20 carbon atoms in the acid moiety and having from 5 to 50 moles of poly(ethylene oxide) per acid molecule.

The present invention further comprises an essentially solvent-free stable aqueous dispersion of an epoxy resin which comprises (a) from about 40 to about 65 weight percent epoxy resin having an average molecular weight from about 4,000 to about 100,000, preferably from about 4,000 to about 8,000, (b) from 0.5 to 13 weight percent nonionic surfactant selected from the group consisting of the polyoxyethylene esters of a fatty, rosin or tall oil acid having 8 to 20, preferably a fatty acid having 12 to 18, carbon atoms in the acid moiety and having from 5 to 50, preferably 35 to 50, moles of poly(ethylene oxide) per acid molecule, (c) from 2 to 5% by weight of an organic solvent having a boiling point below 160° C. and being selected from the group consisting of aromatic hydrocarbons, esters, ethers, alcohols, ketones, halogenated aromatic hydrocarbons and mixtures thereof, preferably methyl ethyl ketone, methyl amyl ketone and ethyl acetate and most preferably methyl ethyl ketone, and (d) from about 35 to 60% by weight water with no particles larger in size than 5 microns.

The present invention further also comprises a low organic solvent, stable aqueous emulsion of an epoxy resin which comprises (a) from about 35 to about 65 weight percent epoxy resin having an average molecular weight from about 4,000 to about 100,000, preferably from about 4,000 to about 8,000, (b) from 0.5 to 13 weight percent nonionic surfactant selected from the group consisting of the polyoxyethylene esters of a fatty, rosin or tall oil acid having 8 to 20, preferably a fatty acid having 12 to 18, carbon atoms in the acid moiety and having from 5 to 50, preferably 35 to 50, moles of poly(ethylene oxide) per acid molecule, (c) from 8 to 20% by weight of an organic solvent having a boiling point below 160° C. and being selected from the group consisting of aromatic hydrocarbons, esters, ethers, alcohols, ketones, halogenated aromatic hydrocarbons and mixtures thereof, preferably methyl ethyl ketone, methyl amyl ketone and ethyl acetate and most preferably methyl ethyl ketone, and (d) from about 35 to 60% by weight water with no particles larger in size than 5 microns.

The product of the process of this invention is a stable essentially solvent-free aqueous dispersion, having no particles larger in size than 5 microns or a fine particle, low solvent emulsion of an epoxy resin.

The products can be stored under ambient conditions for long periods (up to 12 months) without agglomeration of the epoxy resin particles. The products are well suited for the subsequent preparation of water-dilutable, heat-curable compositions, or in the case of high molecular weight epoxy resins to be used directly to form coatings.

It is also contemplated that the products of the process of this invention may be used as integral components in other water-borne resin compositions used in the preparation of coatings, films and the like. Such resin compositions would include the hydroxyalkyl acrylic esters, hydroxy alkyds, polyesters, acrylamides, epoxy resins and the like.

The preferred concentration of epoxy resin in organic solution is from 50 to 60% by weight with 4 to 8% by weight of a nonionic surfactant based on the epoxy resin.

The preferred amount of water to be added to the organic solution of the epoxy resin is such as to give a mixture containing from 28 to 33% by weight water.

The homogenizing action can be carried out in a variety of equipment which can subject the aqueous-organic mixture to high shear forces. Preferably the equipment is a Gifford-Wood Colloid Mill with a gap setting at 20. A Manton-Gaulin Homogenizer can be used also at a pressure of 3,000–6,000 psi (210–420 kg/cm$^2$).

The temperature at which the vacuum distillation to remove organic solvent takes place cannot exceed 40° C. and preferably is kept between 30° and 35° C. The pressure for the vacuum distillation is kept at 10 to 80 mm Hg and preferably at 10 to 20 mm Hg.

The aromatic polyglycidyl ethers that can be used in this invention comprise those organic materials which have more than one terminal vic-epoxy group, i.e.,

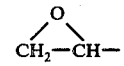

The aromatic polyglycidyl ethers are solid polyepoxides. The polyepoxides useful in the process of this invention are derived from polyhydric phenols, preferably dihydric phenols, and may be substituted with substitutents, such as chlorine, hydroxyl group, ether radicals, and the like.

The polyepoxides comprise a relatively large class of materials and have been described in numerous patents such as U.S. Pat. Nos. 2,467,171, 2,615,007, 2,716,123, 3,030,336, 3,053,855, 3,075,999 and 3,624,180. The disclosures of the various polyepoxides in said patents are incorporated herein by reference.

The preparation of glycidyl polyethers of dihydric phenols is illustrated in U.S. Pat. Nos. 2,582,985, 2,615,007 and 2,633,458.

The aromatic polyglycidyl ethers useful in the process of this invention are solid epoxy resins having an average molecular weight in the range of 4,000 to 100,000 or average epoxy equivalent weight of 2,000 to 50,000. These aromatic glycidyl ethers are prepared by the glycidylation of polyhydric phenols using epichlorohydrin and alkali. Among the dihydric phenols which may be used to prepare the aromatic polyglycidyl ethers suitable for use in the process of this invention are: 2,2-bis(4-hydroxyphenyl)propane, 2,2-bis-(3-bromo-4-hydroxyphenyl)propane, 2,2-bis(3,5-dichloro-4-hydroxyphenyl)propane, 2,2-bis(3-chloro-4-hydroxyphenyl)propane, bis(4-hydroxyphenyl)methane, bis(4-hydroxyphenyl)sulfone, bis(4-hydroxyphenyl)sulfide, resorcinol and hydroquinone. The preferred dihydric phenols are 2,2-bis(4-hydroxyphenyl)propane (bisphenol A) and bis(4-hydroxyphenyl)methane (bisphenol F). Most preferred is 2,2-bis(4-hydroxyphenyl)propane for reasons of cost and commercial availability.

The preferred epoxy resins useful in this invention have an average molecular weight between 4,000 and 8,000.

The organic solvents useful in the processes of this invention must fulfil several criteria. First and most importantly, they must dissolve the epoxy resin. Second, they should be easily removed from the aqueous system by distillation under vacuum. Thus, a combination of appropriate volatility, relatively low boiling point (below 160° C.) and proper azetropic behavior with water characterize the organic solvents useful in the instant processes.

Water solubility or water miscibility is not a requisite for the organic solvent to be useful in the instant invention. Indeed, it may be more difficult to use a water soluble organic solvent such as acetone in the instant processes than a solvent with more modest water solubility such as methyl ethyl ketone or a solvent with almost no water solubility such as benzene. Mixtures of organic solvents can also be used in these processes.

Examples of organic solvents useful in this invention include for illustrative purposes only:

ketones — methyl ethyl ketone, methyl amyl ketone, diethyl ketone, acetone, methyl isopropyl ketone, cyclohexanone;

ethers — tetrahydrofuran, 1,2-dimethoxyethane, 1,2-diethoxyethane;

esters — ethyl acetate, n-butyl acetate;

alcohols — n-butanol, isopropanol;

aromatic hydrocarbons — benzene, toluene, xylene; and halogenated aromatic compounds — chlorobenzene.

The preferred organic solvents for the processes of this invention are methyl ethyl ketone, ethyl acetate, methyl amyl ketone or mixtures thereof.

The most preferred solvent is methyl ethyl ketone.

Cationic, anionic and nonionic surfactants or dispersing agents are useful in the process of this invention. Nonionic surfactants are preferred, however, since products made by the instant process are particularly useful in water-dilutable, heat-curable coating compositions where the ultimate film properties are important. Water sensitivity is detrimental to good coating performance. Thus, cationic and particularly anionic surfactants tend to increase water sensitivity in the ultimate film or coating. Accordingly, nonionic surfactants are preferred since they produce less ancillary deficiencies in the coatings made using the products of this invention.

The amount of nonionic surfactant useful in the process of this invention is from 1 to 25% by weight of the epoxy resin. Preferably 4 to 8% by weight of surfactant based on the epoxy resin is used.

It is contemplated that nonionic surfactants including ethoxylated alkylphenols, ethoxylated aliphatic alcohols, carboxylate esters, carboxylic amides and polyoxyalkylene oxide block copolymers or mixtures thereof would have varying degrees of usefulness in the instant process.

Among this broad spectrum of nonionic surfactants, one class of materials was found to be particularly efficacious, namely, the polyethylene glycol esters of fatty, rosin and tall oil acids having 8 to 20 carbon atoms per acid moiety.

These esters are often mixtures of monoesters and diesters. The fatty acid may have from 5 to 50 moles of poly(ethylene oxide) per acid molecule.

Preferably from 35 to 50 moles of poly(ethylene oxide) per acid molecule is used with the fatty acids of 12 to 18 carbon atoms in the surfactants particularly efficacious in the instant process.

Acids esterified with polyethylene glycol to prepare the nonionic surfactants of the present invention include tall oil acid, rosin acid, ricinoleic, oleic, lauric, palmitic, myristic, margaric and stearic acids as well as mixtures of fatty acids. Fatty acids of 12 to 18 carbon atoms are preferred.

Such ester surfactants are commercially available under a variety of trademarks including "Dion" (Diamond Shamrock), "Emerest" (Emery) and "Aldosperse" and "Pegosperse" (Glyco Chemicals).

Of particular effectiveness in the instant process is the nonionic surfactant "Dion 37" with about 50 moles of ethylene oxide per molecule of a fatty acid with 12-18 carbon atoms.

The useful nonionic surfactants are high-boiling, nonvolatile and relatively hydrophilic as seen by a high content of poly(ethylene oxide) ester bonded to the fatty acid.

An optional feature of the present invention pertains to the preparation of water-dilutable, heat-curable coating compositions. Such compositions may be made in two ways either:

(1) by adding to the aqueous dispersion or aqueous, low organic solvent fine particle emulsion prepared according to the instant process described above 5 to 50% by weight of solids of an aminoplast or phenoplast curing agent and sufficient water to bring the total percent solids in the range of 10 to 80% by weight; or (2) by adding to the organic solution of the epoxy resin containing the nonionic surfactant from 5 to 50% by weight solids of an aminoplast or phenoplast curing agent ultimately needed to cure said epoxy resin properly prior to the steps when water is added to the organic solution of the epoxy resin, the resulting system in homogenized and the organic solvent removed by vacuum distillation to form an essentially organic solvent free, water-dilutable aqueous coating composition or low solvent emulsion composition also water-dilutable. Additional water is then added, if needed, to bring the total percent solids in the range of 10 to 80% by weight.

Thus, the aminoplast or phenoplast curing agent can be added to the epoxy resin before the aqueous dispersion or fine particle emulsion is prepared by the instant process or to the final dispersion or emulsion itself.

The product of this optional process is a water-dilutable, heat-curable coating composition comprising the epoxy resin, nonionic surfactant, aminoplast or phenoplast curing agent and water as an essentially solvent-free aqueous dispersion or low solvent emulsion. The compositions have no particles larger in size than 5 microns.

The instant compositions are water-dilutable and yield stable, uniform compositions over a wide range of aqueous systems concentrations from 10 to 80% solids by weight. Preferably the percent solids concentration range is 30 to 70% by weight and most preferably 40 to 60% by weight.

The aminoplast or phenoplast curing agent in the product of the optional process of this invention is from 5 to 50% by weight of solids, preferably from 5 to 40% by weight of solids and most preferably from 5 to 30% by weight of solids.

The water-dilutability of the compositions of this invention is accomplished with the aid of selected organic solvents, but most or essentially all of the organic solvent is first removed by distillation to yield an essentially solvent-free aqueous dispersion or low solvent emulsion which can be further diluted with the standard aminoplast or phenoplast curing agent and water. Thus, while during the preparation of the water-dilutable coating composition the aid of organic cosolvent is required, the organic solvent is removed under controlled, environmentally protective conditions before the instant coating composition is used in the field in coating operations where organic solvents released into the atmosphere are undesirable.

The advantages of such a water system are a reduction in fire hazards since flammable organic solvents are replaced by water, the lack or odors and noxious and toxic fumes to be controlled during the manufacture and subsequent use of the coating composition, and the lack of need for an expensive solvent recovery system which would be mandated by both economic and ecological reasons.

Increasing concern about environmental and health hazards, as exemplified by the California Rule 66 ban on the release of organic vapors into the atmosphere and in recent OSHA regulations on banning undue exposure of workers to potentially toxic organic vapors often encountered in conventional coating operations, points to the need for replacing organic solvents in coating compositions with water dilutable systems. The compositions of this invention provide a practical means of preparing coatings based on epoxy and aminoplast or phenoplast curing agents, which are known to give good coating performance, in a new and desirable process using aqueous systems thereby totalling circumventing the hazards to personnel and the environment inherent with the conventional process using organic solvents.

Two criteria must be met by the products of the process of this invention for operability. These are: (1) the composition prepared by the process must be water-dilutable to yield a stable, aqueous or aqueous organic system; (2) the coating prepared from such an aqueous or aqueous organic system must be essentially equivalent in properties to epoxide coatings prepared from all organic solvent systems. That is the coatings made from the compositions of the process of this invention must not have unacceptable flaws directly related to the use of water as the coating composition medium or to other individual components in the composition.

The coatings prepared from the composition made by either process of this invention are essentially comparable in physical properties, appearance, durability, clarity, lack of tack, toughness, adhesion, strength, impact resistance and the like to coatings prepared from conventional coating compositions in organic solvents. Surprisingly, these cured coatings are also essentially as insensitive to water as coatings prepared from conventional organic solvent systems.

Governmental air pollution regulations, such as California Rule 66 and its newly modified version Rule 442, generally refer to amounts of organic solvents in terms of volume percents. Most present regulations limit the organic solvent portion of the liquid phase to 20% by volume, but recently 30% by volume systems are also permitted in many circumstances.

Since most organic solvents used in this invention have densities somewhat less than 1.0, a 20–30% by volume limit would by rule of thumb be equivalent approximately to 17–25% by weight of organic solvent.

The urea-formaldehyde and melamine-formaldehyde aminoplast curing agents are commercially available, e.g., respectively "Beetle 65" of American Cyanamid, "Beckamines" of Reichhold Chemical, "Uformite MM-83" of Rohm and Haas and "Cymel 303" of American Cyanamid. The latter is a hexamethoxymethylmelamine material largely monomeric in structure while the other materials cited are oligomeric or polymeric in nature.

Some curing agents employed in this invention are nitrogen-containing resin precursors particularly those capable of being insolubilized at acid pH values and which act as crosslinking agents under acid conditions. These are resin precursors, urea-formaldehyde type resins and the substituted cyclic triazines. Suitable groups of resin precursors include dimethylol and polymethylol derivatives of urea, N,N'-ethylene urea, N,N'-propylene urea, dihydroxyethylene urea, thiourea, dicyandiamide, guanidine, esters of carbamic acid, methylolated aminotriazines and methylolated triazines as well as their etherfication products. Other useful precursors include 1,3-bis(hydroxymethyl)-2-imidazolidinone or dimethylolethyleneurea, $N^2,N^4,N^6$-tris-(hydroxymethyl)melamine, hexahydro-1,3,5-tris(3-methoxypropionyl)-s-triazine, benzoguanamine, ammeline, 4,6-diaminopyrimidine, acetoguanamine, melamine, benzyl urea, 3,5-diamino-triazole, diazine diamide and the like.

The aminoplast curing agents employed in this invention include the reaction products of an aldehyde with nitrogen compounds listed above. The aldehydes that can be used conveniently include formaldehyde acetaldehyde, paraformaldehyde, trioxane, crotonaldehyde, acrolein, benzaldehyde, and furfural. The preferred nitrogen compounds are melamine and urea and the preferred aldehyde is formaldehyde.

These aldehyde condensation products contain methylol groups or similar alkylol groups depending on the aldehyde used. It is often desired to etherify the methylol group by reaction with a monohydric alcohol. While any monohydric alcohol can be used, the preferred alcohols are methanol, butanol, ethanol, pentanol, hexanol or octanol.

The amine-aldehyde condensation products are produced in a manner well known in the art, using acidic or basic catalysts and varying conditions of time and temperature. The aldehyde is often employed as a solution in water or alcohol and the condensation polymerization and etherification reactions may be carried out either sequentially or simultaneously. The reaction is usually effected in the usual formaldehyde:urea resins mol proportion of 1:1.5 to 1.4 and formaldehyde:melamine resins of 1:1.5 to 1.6. The aminoplast is preferably used in partially or completely etherified form. One preferred aminoplast used in this invention is hexamethoxymethyl melamine.

Preferably the aminoplast curing agent is selected from the group consisting of urea-formaldehyde resins, melamine-formaldehyde resins, hexamethoxymethylmelamine and other nitrogen resin precursors. The amount of said aminoplast curing agent in the composition is 5 to 50% by weight of solids, and is preferably 5 to 40% by weight of solids.

Most preferably the aminoplast curing agent is a methylated urea-formaldehyde resin available commercially as "Beetle 65" from American Cyanamid, and a methoxy methyl melamineformaldehyde resin available commercially as "Uformite MM-83" from Rohm and Haas or a nitrogen resin precursor, hexamethoxymethylmelamine available commercially as "Cymel 303" from American Cyanamid. The amount of said aminoplast curing agent in the composition is most preferably 5 to 30% by weight of solids.

In some cases acid catalysts, such as p-toluene sulfonic acid, cyclohexanesulfamic acid, butyl acid phosphate and phosphoric acid, can be added to blends of aminoplast or phenolplast and hydroxy-containing materials of this invention to increase the rate of the curing reaction, producing films or coatings that will cure at a lower temperature or in a shorter time. Up to 2 percent by weight of the solids have been found to be advantageous in some instances.

Coatings compositions prepared from a hydroxy-containing material of this invention with an aminoplast or phenolplast can be applied to a substrate by conventional means such as brushing, spraying, dipping and roller-coating. The coatings are cured by heating at 100° and 250° C. for a time sufficient to effect a cure, such times generally being from about 5 minutes to about 1 hour.

Other curing agents which may be employed in the process of this invention are phenoplast resins which include etherified resols of phenolic resins, formaldehydephenol carboxylic acid resins and phenolic resins precursors. A preferred phenoplast curing agent is phenolic hardener HZ-949U available commercially from CIBA-GEIGY Corporation, which is an etherified resol-type resin based on bisphenol-A.

The following examples are illustrative of the invention, but are not meant to limit the scope of the same in any fashion whatsoever.

EXAMPLE 1

Preparation of Epoxy Dispersion

A solution of 92 grams of a solid epoxy resin derived from the diglycidyl ether of bis-phenol A [2,2-bis(4-hydroxyphenyl)propane], having a molecular weight in the range of 4,000 to 5,000, and commercially available from the CIBA-GEIGY Corporation as "Araldite" 6097 and 8 grams of a surfactant derived from the ethylene oxide esters of long chain fatty acids ($C_{16}$–$C_{18}$) with an ethylene oxide content of about 50 moles per mole of fatty acid, and commercially available from the Diamond Shamrock Company as "Dion" 37 was prepared in 80 grams of methyl ethyl ketone at room temperature with the aid of a commercial paint shaking machine (red Devil Shaker). The resulting solution was then stirred with a T-line laboratory mixer and 80 grams of deionized water was slowly added over a 10-minute period. A very viscous oil-in-water emulsion resulted with a particle size range (% of total) $\leq 1\mu$ (30%) and 2–10$\mu$ (70%). This crude emulsion was then run through a Gifford-Wood colloid mill with a gap setting of 20 to produce a finer emulsion where 100% of the particles $\leq 2\mu$.

The resultant emulsion was then placed in a 500-ml round-bottomed flask equipped with a mechanical stirrer, condenser and vacuum adapter. After adding three drops of a defoaming agent (Dapro DF 911, Daniels Products Company), the stirred solution was heated to 35° C. and vacuum was applied to a pressure of 10–20 mm Hg. for 45 minutes during which period all but approximately 1 to 3% of the methyl ethyl ketone organic solvent was removed. A creamy aqueous dispersion was formed having 55–57% solids by weight, a viscosity of 2,000–4,000 cps (Brookfield) and particle size $\leq 2\mu$ (100%).

EXAMPLE 2

When using the procedure of Example 1 the solid epoxy resin commercially available as "Araldite" 6097 was replaced by the same weight of a solid epoxy resin of the same composition, but with a molecular weight range of 5,000 to 8,000, and commercially available from CIBA-GEIGY Corporation as "Araldite" 6099, a creamy aqueous dispersion was prepared having 54.6% solids by weight, a viscosity of 70 seconds (#4 Ford Cup) and particle size distribution $\leq 1\mu$ (99%) and $\leq 1 > 4\mu$ (1%).

EXAMPLE 3

A formulation suitable for coating applications on various substrates was prepared by adding to 100 grams of the dispersion of Example 1 while stirring by hand 6 grams of hexamethoxymethylmelamine, aminoplast curing agent, commercially available as "Cymel" 303 from American Cyanamid and 10 grams of water. This formulation was then catalyzed using 0.12 grams of a 28.7% solids in water catalyst, Curing Agent C (American Biosynthetics). A silicone flow control agent, 0.3 grams of 50% aqueous Byk 301 (Byk-Mallinkrodt) was then added to improve flow.

The formulation was applied using a No. 6 1.27 cm rod onto treated aluminum. The coated substrate was then subjected to a cure cycle of 10 minutes at 204° C. by baking in a forced draft oven. The average film weight on the substrate was 12 mg/25.8 cm$^2$.

The coated substrate was subjected to a number of standard tests as seen below to assess the performance of the coatings applied.

| Test Method | Substrate Treated Aluminum |
| --- | --- |
| MEK Resistance (single rubs) Farbication of 303 Can End (inside coated) | >500 (Pass) Pass |
| Beer Pasteurization 30 Min. 71° C (in closed container) | Appearance: No Change (Pass) Adhesion: Excellent |
| Water Pasteurization 30 Min 71° C (in closed container) | Appearance: No Change (Pass) Adhesion: Excellent |
| Wedge Bend, mm (ASTM D3281-73) 303 Can End | 28 (Pass) |
| Immersed 8 minutes in CuSO$_4$ solution | Pass |

The MEK resistance test involved determining the number of single pass rubs that a cast film coating will withstand before exposure of the substrate occurs when subjected to passage of a soft cotton cloth saturated with methyl ethyl ketone wrapped around an operator's index finger with moderate pressure across the coating surface. The values were highly subjective depending on the operator, but valuable relative data on surface integrity and coating quality were obtained.

EXAMPLE 4

Another formulation was prepared using the procedure of Example 3 with 97.2 grams of the dispersion of Example 1, 2.8 grams of hexamethoxymethymelamine, "Cymel" 303, 2 grams of water, 0.23 grams of Curing Agent C solution and 0.28 grams of flow control agent solution.

Coatings made on treated aluminum and cured for 10 minutes at 204° C. were evaluated having the following properties.

| Test Method | Substrate Treated Aluminum |
|---|---|
| MEK Resistance (single rubs) | >500 (Pass) |
| Fabrication of 303 Can End (inside coated) | Pass |
| Beer Pasteurization 30 Min, 71° C (in closed container) | Appearance: No Change (Pass) Adhesion: Excellent |
| Water Pasteurization 30 min, 71° C (in closed container) | Appearance: No Change (Pass) Adhesion: Excellent |
| Wedge Bend, mm (ASTM D3281-73) | 21 (Pass) |
| 303 Can End Immersed 4 minutes in CuSO₄ solution | Pass |
| MEK (single rubs) | >5 |
| Wedge Bend, mm (ASTM D3281-73) | 0 (Pass) |
| 303 Can End Immersed 3 minutes in CuSO₄ solution | Pass |

EXAMPLE 5

Preparation of a High Molecular Weight Epoxy Dispersion

To a solution of 80 grams of solid epoxy resin derived from the diglycidyl ether of bis-phenol A, having a molecular weight in the range of 80,000, and commercially available from Shell as "Eponol" 53-B-40 as a 40% solids solution in methyl ethyl ketone (MEK), in 120 grams of MEK was dissolved at 40° C. with shaking on a Red Devil Paint Shaker 6.4 grams of the surfactant "Dion" 37. To this solution was then added 100 grams of deionized water with stirring at high speed using an Eppenbach Homo-Mixer.

The resulting oil/water emulsion was vacuum distilled on a rotating evaporator at under 40° C. and 40 mm Hg pressure till 113 grams of volatiles were removed. The resulting dispersion had 43.5% solids, 3.5% organic solvent and a particle size distribution of 99% ≦2μ and 1% 3–5μ.

EXAMPLE 6

Thermosetting Coating from High Molecular Weight Epoxy Dispersion

To 123.6 grams of the dispersion formed in Example 5 was added 6.4 grams of Cymel 303 while stirring the solution by hand.

The formulation prepared was catalyzed by the addition of 0.65 gram of 50% aqueous phosphoric acid. Flow of the formulation was aided by adding 1.6 grams of 10% aqueous Pluronic F-108 (BASF-Wyandotte) flow control agent.

The formulation was applied onto treated aluminum following the general procedure of Example 3 to prepare coatings which withstood more than 500 single rubs in the MEK resistance test.

EXAMPLE 7

Coating From High Molecular Weight Epoxy Dispersion

The high molecular weight epoxy resin dispersion prepared in Example 5 was coated onto treated aluminum with a No. 7 RDS rod without any additional hardeners, catalysts or other additives being present. The coated substrate was baked for 5 minutes at 204° C. to give a coating which had these properties.

EXAMPLE 8

Preparation of Low Solvent Co-Emulsion

To a solution of 132 grams of epoxy resin used in Example 1 ("Araldite" 6097) and 18 grams of a surfactant which is a polyethylene glycol ester of stearic acid with 40 moles of esterified polyoxyethylene, and commercially available as "Aldosperse" S-40 from Glyco, in 130 grams of methyl ethyl ketone were added 30 grams of aminoplast curing agent, hexabutoxymethylmelamine, available commercially as "Cymel" 1156 from American Cyanamid, and 20 grams of methyl amyl ketone. This mixture was stirred vigorously with an Eppenbach Homo-mixer while 150 grams of water was added over a 5-minute period. Under reduced stirring was then added 20 grams of ethylene glycol to insure freeze-thaw stability. The resulting emulsion was distilled from a rotary evaporator at <40° C. and 40 mm Hg pressure to remove 26% of the total formulation weight as volatiles. The creamy dispersion still containing a low amount of organic solvent (about 11%) was prepared having 49% solids, a viscosity of 336 cps (Brookfield) and particle size distribution ≦1μ (95%) and 2–4μ (5%).

EXAMPLE 9

Preparation of Low Solvent Co-Emulsion

To a solution of 905 grams of epoxy resin used in Example 1 ("Araldite" 6097) and 85 grams of surfactant ("Dion" 37) dissolved in 810 grams of methyl ethyl ketone were added 240 grams of methyl amyl ketone and 505 grams of an 80% solids solution in n-butanol of a phenolic hardener available commercially as HZ 949U from CIBA-GEIGY Corporation. This mixture was stirred vigorously with an Eppenbach Homomixer while 1,071 grams of water was added over a 10-minute period. The resulting emulsion was distilled on a rotary evaporator at <40° C. and 40 mm Hg. pressure to remove 22% of the total formulation weight as volatiles. The resulting emulsion, still containing a low amount of organic solvent (about 10%), had 45% solids, a viscosity of 34 seconds (#4 Ford Cup) and a particle size distribution ≦1μ (95%) and 2–4μ (5%).

What is claimed is:

1. An improved process for preparing a stable aqueous dispersion having no particles large in size than 5 microns or an aqueous, low organic solvent fine particle emulsion of an epoxy resin having a molecular weight from about 4,000 to about 100,000 useful in forming water-dilutable, heat-curable coating compositions with aminoplast or phenoplast curing systems, which comprises dissolving said epoxy resin in an organic solvent to prepare a 40 to 80% by weight solution, said organic solvent containing from 1 to 25% by weight based on the epoxy resin of a nonionic surfactant and said organic solvent having a boiling point below 160° C. and being selected from the group consisting of aromatic hydrocarbons, esters, ethers, alcohols, ketones, halogenated aromatic hydrocarbons and mixtures thereof, adding with stirring sufficient water to give a mixture containing from 30 to 50% by weight water, subjecting the resulting mixture to homogenizing action using a colloid mill, homogenizer or other high speed, high shear mixer, removing essentially all the organic solvent present by vacuum distillation at a temperature under 40° C. and with a pressure of about 5 to 100 mm Hg to give an essentially solvent free aqueous dispersion having from about 40 to 65 weight percent epoxy resin, from about 0.5 to 13 weight percent nonionic surfactant and from about 35 to 60 weight percent water; or removing from 40 to 70 percent of the organic solvent by vacuum distillation under 40° C. and with a pressure of about 5 to 100 mm Hg to give a low organic solvent aqueous emulsion having about 35 to 65 weight percent epoxy resin, from about 0.5 to 13 weight percent nonionic surfactant, from about 8 to 20 weight percent organic solvent and from about 35 to 60 weight percent water, wherein the improvement comprises using as the nonionic surfactant a dispersing agent selected from the group consisting of the polyoxyethylene esters of fatty, rosin and tall oil acids having 8 to 20 carbon atoms in the acid moiety and having from 5 to 50 moles of poly(ethylene oxide) per acid molecule.

2. A process according to claim 1 wherein the epoxy resin is an aromatic polyglycidyl ether derived from 2,2-bis(4-hydroxyphenyl)propane.

3. A process according to claim 2 wherein the epoxy resin has an average molecular weight between 4,000 and 8,000.

4. A process according to claim 1 wherein the organic solvent is selected from the group consisting of methyl ethyl ketone, methyl amyl ketone, ethyl acetate and mixtures thereof.

5. A process according to claim 4 wherein the organic solvent is methyl ethyl ketone.

6. A process according to claim 1 wherein the nonionic surfactant has 35 to 50 moles of poly(ethylene oxide) per acid molecule.

7. A process according to claim 6 wherein the nonionic surfactant is an ester of a fatty acid of 12 to 18 carbon atoms with about 50 moles of poly(ethylene oxide) per acid molecule.

8. A process according to claim 1 wherein from 4 to 8% by weight, based on the epoxy resin, of the nonionic surfactant is used.

9. A stable aqueous dispersion of an epoxy resin which comprises (a) from about 40 to about 65 weight percent epoxy resin having an average molecular weight from about 4,000 to about 100,000, (b) from 0.5 to 13 weight percent nonionic surfactant selected from the group consisting of the polyoxyethylene esters of a fatty, rosin or tall oil acid having 8 to 20 carbon atoms in the acid moiety and having from 5 to 50 moles of poly(ethylene oxide) per acid molecule, (c) from 2 to 5% by weight of an organic solvent having a boiling point below 160° C. and being selected from the group consisting of aromatic hydrocarbons, esters, ethers, alcohols, ketones, halogenated aromatic hydrocarbons and mixtures thereof, and (d) from about 35 to 60% by weight water with no particles larger in size than 5 microns.

10. A dispersion according to claim 9 wherein the epoxy resin has an average molecular weight from about 4,000 to about 8,000.

11. A dispersion according to claim 10 wherein the nonionic surfactant is selected from the group consisting of the polyoxyethylene esters of a fatty acid having 12 to 18 carbon atoms in the acid moiety and having 35 to 50 moles of poly(ethylene oxide) per acid molecule.

12. A dispersion according to claim 10 wherein the organic solvent is selected from the group consisting of methyl ethyl ketone, methyl amyl ketone, ethyl acetate and mixtures thereof.

13. A dispersion according to claim 10 wherein the organic solvent is methyl ethyl ketone.

14. A low organic solvent, stable aqueous emulsion of an epoxy resin which comprises (a) from about 35 to about 65 weight percent epoxy resin having an average molecular weight from about 4,000 to about 100,000, (b) from 0.5 to 13 weight percent nonionic surfactant selected from the group consisting of the polyoxyethylene esters of a fatty, rosin or tall oil acid having 8 to 20 carbon atoms in the acid moiety and having from 5 to 50 moles of poly(ethylene oxide) per acid molecule, (c) from 8 to 20% by weight of an organic solvent having a boiling point below 160° C. and being selected from the group consisting of aromatic hydrocarbons, esters, ethers, alcohols, ketones, halogenated aromatic hydrocarbons and mixtures thereof and (d) from about 35 to 60% weight water with no particles larger in size than 5 microns.

15. An emulsion according to claim 14 wherein the epoxy resin has an average molecular weight from about 4,000 to about 8,000.

16. An emulsion according to claim 14 wherein the nonionic surfactant is selected from the group consisting of the polyoxyethylene esters of a fatty acid having 12 to 18 carbon atoms in the acid moiety and having 35 to 50 moles of poly(ethylene oxide) per acid molecule.

17. An emulsion according to claim 14 wherein the organic solvent is selected from the group consisting of methyl ethyl ketone, methyl amyl ketone, ethyl acetate and mixtures thereof.

18. An emulsion according to claim 14 wherein the organic solvent is methyl ethyl ketone.

19. A process for preparing a water-dilutable, heat-curable coating composition, comprising an epoxy resin, a nonionic surfactant, organic solvent, water and an aminoplast or phenoplast curing agent, which comprises adding to the aqueous dispersion or aqueous, low organic solvent fine particle emulsion prepared according to the process of claim 1, 5 to 50% by weight of solids of an aminoplast or phenoplast curing agent and sufficient water to bring the total percent solids in the range of 10 to 80% by weight, or adding to the epoxy resin dissolved in the organic solvent containing the nonionic surfactant from 5 to 50% by weight of solids of an aminoplast or phenoplast curing agent, the adding water with stirring, subjecting the resulting mixture to homogenizing action, removing the organic solvent by vacuum distillation according to the procedure of claim 1, and finally adding sufficient water to bring the total percent solids in the range of 10 to 80% by weight.

20. The process according to claim 19 wherein the total percent solids are in the range of 30 to 70% by weight.

21. The process according to claim 19 wherein the total percent solids are in the range of 40 to 60% by weight.

22. The process according to claim 19 wherein the aminoplast or phenoplast curing agent is present in the amount of 5 to 40% by weight of solids.

23. The process according to claim 19 wherein the aminoplast or phenoplast curing agent is present in the amount of 5 to 30% by weight of solids.

24. The process according to claim 19 wherein the aminoplast curing agent is a methylated urea-formaldehyde resin.

25. The process according to claim 19 wherein the aminoplast curing agent is a methoxy methyl melamine-formaldehyde resin.

26. The process according to claim 19 wherein the aminoplast curing agent is hexamethyoxymethylmelamine.

27. The process according to claim 19 wherein the phenoplast curing agent is a phenolic hardener which is an etherified resol resin based on bisphenol-A.

28. A water-dilutable, heat-curing coating composition consisting essentially of the product obtained according to the process of claim 19.

* * * * *